United States Patent
Yokoyama (10) Patent No.: US 7,015,446 B2
(45) Date of Patent: Mar. 21, 2006

(54) LIGHT SOURCE FOR AN OPTICAL APPARATUS IN WHICH THE AMOUNT OF LIGHT EMISSION IS CONTROLLED AT A CONSTANT LEVEL

(75) Inventor: Masafumi Yokoyama, Tokyo (JP)

(73) Assignee: Citizen Watch Co., Ltd., Tokyo (JP)

(*) Notice: Subject to any disclaimer, the term of this patent is extended or adjusted under 35 U.S.C. 154(b) by 67 days.

(21) Appl. No.: 10/468,287

(22) PCT Filed: Feb. 7, 2002

(86) PCT No.: PCT/JP02/01051

§ 371 (c)(1),
(2), (4) Date: Aug. 20, 2003

(87) PCT Pub. No.: WO02/067051

PCT Pub. Date: Aug. 29, 2002

(65) Prior Publication Data

US 2004/0084605 A1    May 6, 2004

(30) Foreign Application Priority Data

Feb. 21, 2001  (JP)  ............................. 2001-045282
Jul. 17, 2001  (JP)  ............................. 2001-217086

(51) Int. Cl.
*H01J 40/14* (2006.01)
(52) U.S. Cl. .................................................. 250/205
(58) Field of Classification Search ................ 250/205, 250/208.1, 548, 552, 553
See application file for complete search history.

(56) References Cited

U.S. PATENT DOCUMENTS 5,247,167 A * 9/1993 Bargerhuff et al. ...... 250/208.1
6,127,783 A * 10/2000 Pashley ..................... 315/149

FOREIGN PATENT DOCUMENTS

| JP | 2-77738 | 3/1990 |
| JP | 9-18655 | 1/1997 |
| JP | 2000-171920 | 6/2000 |

* cited by examiner

Primary Examiner—Thanh X. Luu
Assistant Examiner—Tony Ko
(74) Attorney, Agent, or Firm—Finnegan, Henderson, Farabow, Garrett & Dunner, L.L.P.

(57) ABSTRACT

A light source for an optical apparatus comprises a light emitting device, a light receiving device (300) for detecting the amount of light of the light emitting device, and light emission control means (400) for controlling the amount of light of the light emitting device in accordance with the amount of light detected by the light receiving device, wherein the light receiving device is disposed on one side of the light emitting device to form an optical pair, and a plurality of such optical pairs are arranged on a substrate. The plurality of optical pairs, each consisting of the light receiving device and the light emitting device, are arranged in a substantially straight line on a first substrate (120), and the light emission control means are arranged in a substantially straight line on a second substrate (130).

23 Claims, 9 Drawing Sheets

LIGHT SOURCE FOR AN OPTICAL APPARATUS IN WHICH THE AMOUNT OF LIGHT EMISSION IS CONTROLLED AT A CONSTANT LEVEL

TECHNICAL FIELD

The present invention relates to a light source for an optical apparatus.

BACKGROUND ART

It is known to construct a light source for an optical apparatus from a plurality of light source members and perform control so as to maintain the amount of light emission of the optical apparatus light source constant by detecting the amount of exposure from the optical apparatus light source in an apparatus that provides illumination for exposure using the light produced by the optical apparatus light source (Japanese Unexamined Patent Publication No. S61-264361). In such an apparatus, it has been extremely difficult to control the amount of light from the optical apparatus light source to a constant level.

Especially, in the case of an apparatus, such as a photographic exposure apparatus, that requires high quality exposure, with the prior art method it has been difficult to accurately maintain the entire amount of light at a constant level.

On the other hand, no studies have ever been made on how the plurality of light source members should be placed, in particular, the placement pitch of the light source members, in order to control the amount of light from the optical apparatus light source to a constant level.

DISCLOSURE OF THE INVENTION

The present invention is directed to the provision of a light source that can accurately control the amount of light emission of an LED, etc.

The invention is also directed to the provision of a light source wherein provisions are made to allow accurate maintenance of the distribution of the amount of light from the light source by defining the placement pitch of a plurality of light emitting devices.

According to the present invention, a light source for an optical apparatus comprises a light emitting device, a light receiving device for detecting the amount of light of the light emitting device, and light emission control means for controlling the amount of light of the light emitting device in accordance with the amount of light detected by the light receiving device, wherein the light receiving device is disposed on one side of the light emitting device to constitute an optical pair, and a plurality of such optical pairs are arranged on a substrate. The plurality of optical pairs, each consisting of the light receiving device and the light emitting device, are arranged in a substantially straight line on a first substrate, and the light emission control means are arranged in a substantially straight line on a second substrate.

The plurality of light emitting devices are arranged at pitch P in a substantially straight line, and P/W, representing the ratio of the pitch P to a value W, is set as $0.91 \leq P/W \leq 1.01$, where W is a full width at half maximum (FWHM) of a light amount distribution curve measured in a direction in which the plurality of light emitting devices are arranged when each individual one of the light sources is singly operated to emit light. The ratio P/W may be set as $0.93 \leq P/W \leq 0.99$.

The first substrate and the second substrate are overlaid one on top of the other, and the second substrate is placed under the first substrate. The light emission control means are arranged on the second substrate at positions corresponding to the optical pairs to be controlled by the light emission control means.

A heat insulating member is provided between the first substrate and the second substrate, wherein the heat insulating member is provided on an underside of the first substrate.

The first substrate and the second substrate are secured to a frame to form a line light source unit. The frame has a window for projecting therethrough the light emitted from the plurality of light emitting devices, and the frame is constructed from a thermally conductive member.

The light source also includes connecting means for electrically connecting the first substrate and the second substrate.

The light source further comprises a light blocking member for preventing light from leaking to each of the light receiving devices from other than a corresponding one of the light emitting devices. The light blocking member can be constructed from a light blocking plate provided between the optical pairs.

Further, optical modulating means is provided in the window formed in the frame. Preferably, the optical modulating means is provided inside the frame. The optical modulating means can be constructed from a diffusing plate or a lens.

The light emission control means includes switching means for controlling the supply of current to the light emitting device based on a signal from the light receiving device. The light emission control means includes initial value setting means for setting an initial value for the light emitting device.

The light producing part of the light emitting device can be constructed from an LED. The light emitting device includes a reflecting member for reflecting light from the light emitting device into substantially parallel rays of light, and the reflecting member can be constructed from a spherical concave mirror.

ADVANTAGEOUS EFFECT OF THE INVENTION

In the optical apparatus light source comprising the plurality of light emitting devices, since provisions are made to detect the amount of light emission of each light emitting device by each individual light receiving device and control it to a predetermined amount of light emission by each individual control circuit, it has become possible to control the entire amount of light of the optical apparatus light source with extremely high accuracy.

Furthermore, by defining the placement pitch of the plurality of light sources, the invention has made it possible to maintain the distribution of the amount of light emitted from the light source apparatus uniform. Accordingly, the entire amount of light can be maintained constant with high accuracy even in applications, such as a photosensitive material exposure apparatus, where high quality and high precision exposure is required.

Further, as each light receiving device is disposed in substantially close proximity to one side of the corresponding light emitting device, it has become possible to receive not only the direct light from the light emitting device but also indirect light, thus making it possible to secure a sufficient amount of received light.

The optical pairs are arranged on the first substrate, and the control circuits for controlling the respective optical pairs are formed on the second substrate. This construction using the two substrates serves to prevent the optical pairs from being heated by the heat generated by the control circuits. The construction using the two substrates also facilitates the replacement of LEDs, which are expendable. The control circuits can also be replaced easily.

DETAILED DESCRIPTION OF THE INVENTION

Figure 1:
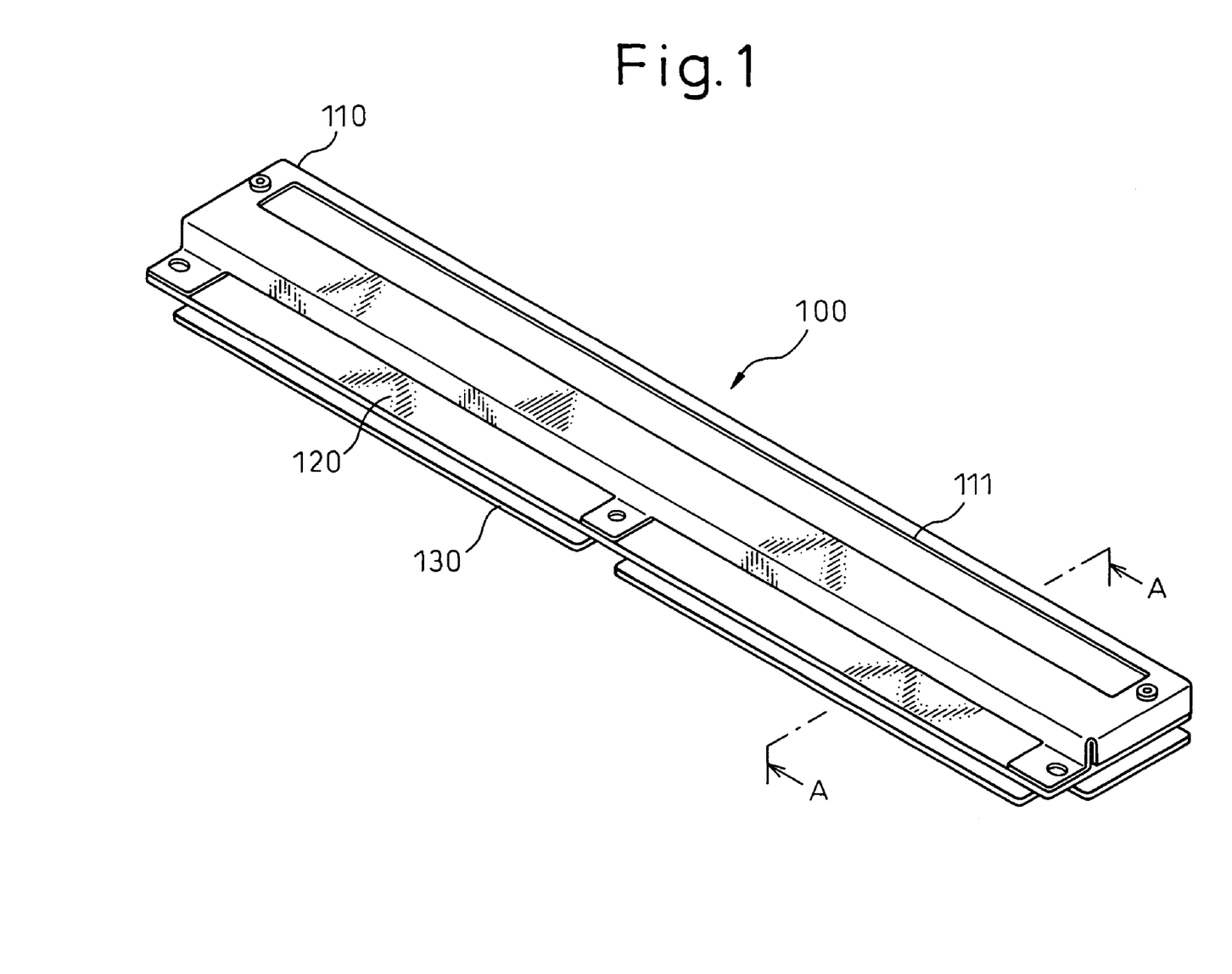
FIG. 1 is an external view of an optical apparatus light source according to the present invention.

FIG. 1 shows an external view of an optical apparatus light source 100 according to the present invention. The optical apparatus light source 100 includes a frame 110, a first substrate 120, a second substrate 130, etc. The frame 110 is provided with a window 111, through which light from the light emitting devices described hereinafter is projected.

Figure 2:
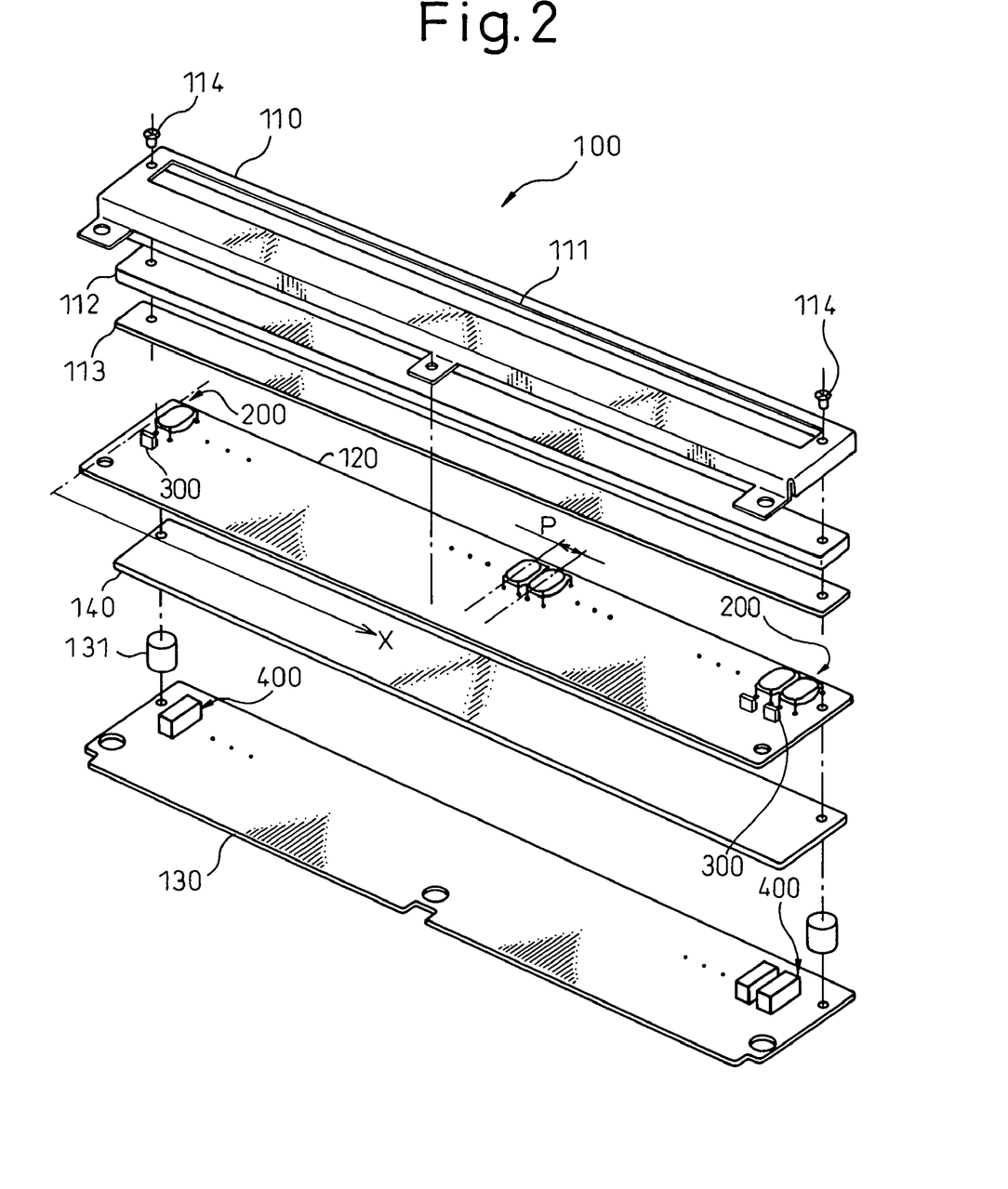
FIG. 2 is an exploded perspective view diagrammatically showing the optical apparatus light source of the present invention.

FIG. 2 is an exploded perspective view diagrammatically showing the optical apparatus light source 100. As shown, a Fresnel lens 112 and a diffusing plate 113 are fixed with screws 114 to the inside of the window 111 of the frame 110 formed from a thermally conductive material such as a metal. Further, 28 optical pairs, each consisting of a light emitting device 200 and a light receiving device 300, are arranged in a substantially straight line on the first substrate 120. The number of light emitting devices 200 is therefore equal to the number of light receiving devices 300. Control circuits 400 for controlling the respective optical pairs are arranged in a substantially straight line on the second substrate 130, each control circuit being positioned substantially directly below its corresponding optical pair. Accordingly, the number of control circuits 400 is equal to the number of optical pairs. The first substrate 120 and the second substrate 130 are connected together via spacers 131. A heat insulation member 140 is interposed between the first substrate and the second substrate. In the illustrated embodiment, the number of optical pairs is 28, but it can be increased or decreased as needed.

The plurality of light emitting devices 200 are arranged at pitch P in a substantially straight line along arrow direction X in the figure. Here, the longitudinal width of each light emitting device 200 is 7.0 mm, and the pitch P is chosen to be 8.4 mm. The longitudinal width and the pitch P can be varied as needed. The pitch P refers to the center to center distance between adjacent light emitting devices in the arrow direction X.

Figure 3:
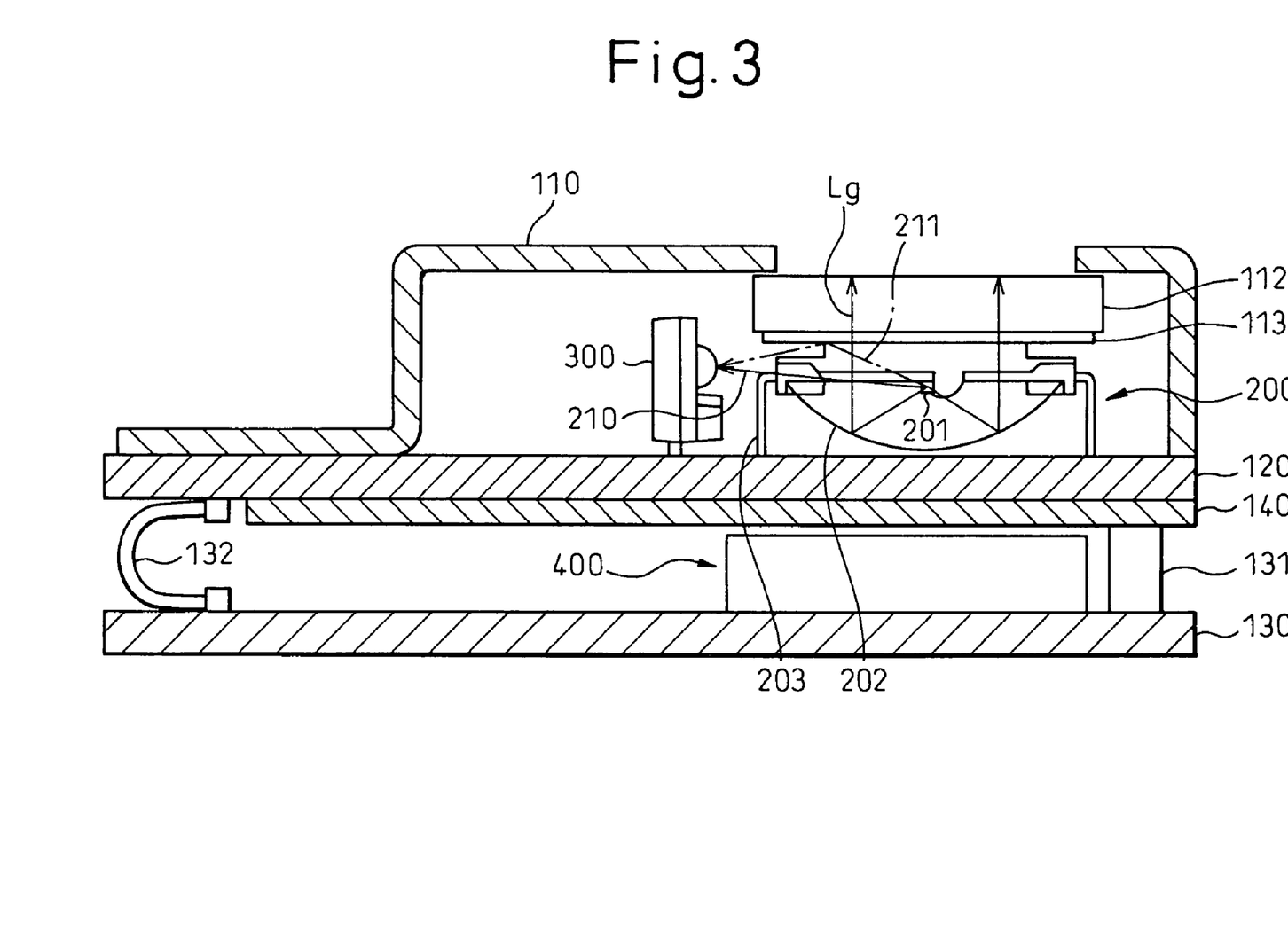
FIG. 3 shows a diagrammatic cross-sectional view of the optical apparatus light source of the present invention.

FIG. 3 shows a cross-sectional view of the optical apparatus light source 100 taken along line A—A in FIG. 1. As shown in FIG. 3, each light emitting device 200 includes a green (G color) LED 201 as a light producing part. The light emitting device 200 may also include a reflecting member 202, for example, a spherical concave mirror, in addition to the light producing LED. A leg part 203 supports the LED 201 and the reflecting member 202. In the present invention, the term "light emitting device" means a device having a light producing part. Accordingly, a light producing part provided with a reflecting member and a leg also falls within the meaning of the term "light emitting device" of the present invention. G light from the G color LED 201 is mostly reflected by the reflecting surface of the reflecting member 202, and projected as projected light Lg from the light emitting device 200. The projected light Lg from the light emitting device 200 is passed through the diffusing plate 113, and converged by the Fresnel lens 112. In the present embodiment, an LED is used as the light producing part, but any other type of light producing element may be used as along as it is of the type whose amount of light emission can be controlled.

The Fresnel lens 112 is an optical modulating means for converging the projected light Lg from the light emitting device 200 onto the desired position on the optical apparatus for which the light source 100 is used. However, depending on the purpose of the optical apparatus for which the optical apparatus light source 100 is used, the Fresnel lens is not an essential element. The diffusing plate 113 is an optical modulating means for equalizing the density distribution of the projected light Lg from the light emitting device 200. However, depending on the purpose of the optical apparatus for which the light source 100 is used, the diffusing plate is not an essential element of the light source 100. Other types of optical modulating means that may be used in the optical apparatus light source 100 include an ND filter, etc.

As shown in FIG. 3, when the upper surface of the light emitting device 200 is planar, the diffusing plate 113 may be placed in contact with the upper surface of the light emitting device 200.

The light receiving device 300 is disposed in substantially close proximity to one side of the light emitting device 200, and is constructed so as to be able to detect direct light 210 from the G color LED 201 and indirect light 211 reflected from the diffusing plate 113. In this way, by disposing the light receiving device 300 in substantially close proximity to one side of the light emitting device 200, not only the direct light but also the indirect light can be received, thus making it possible to secure a sufficient amount of received light. Further, as the light is received before passing through the optical modulating means, i.e., the Fresnel lens 112 and the diffusing plate 113, the received light is free from attenuation due to the optical modulating means. This serves to further increase the amount of received light.

Placing the light receiving device 300 in substantially close proximity to one side of the light emitting device 200 also means that the light receiving device 300 is placed out of the way of the projected light Lg from the light emitting device 200, and this arrangement also makes it possible to make the optical pair consisting of the light emitting device 200 and the light receiving device 300 more compact in construction. The optical pair and its associated control circuit 400 are electrically connected by a connector 132.

Figure 4:
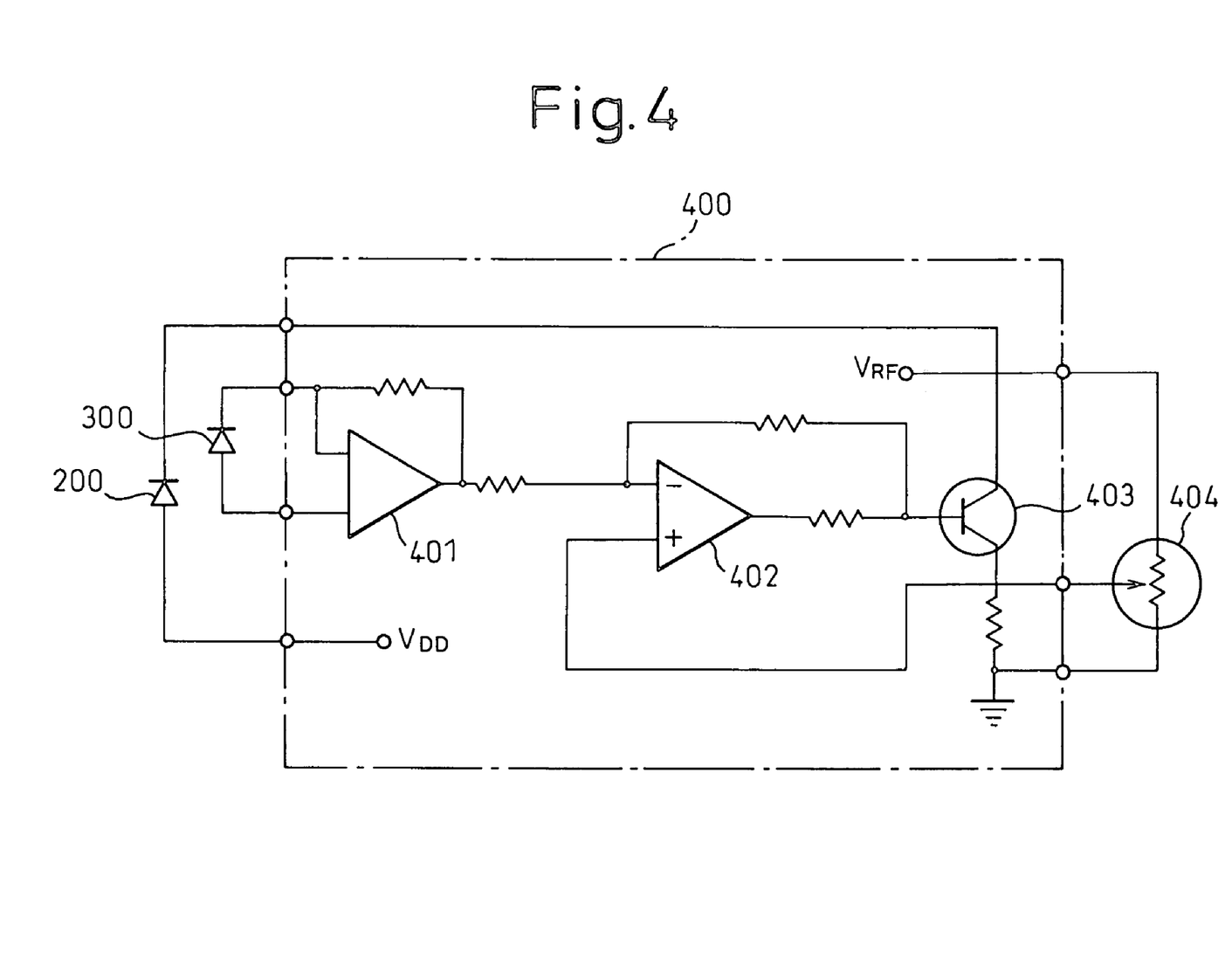
FIG. 4 is a diagram showing the circuit configuration of a control circuit used in the present invention.

FIG. 4 shows an example of the circuit configuration of the control circuit 400. In the control circuit 400, the detection output from the light receiving device 300 is amplified by an amplifier 401. The amplified output is fed to a comparator 402 where the detection output of the light receiving device 300 is compared with an initial value set by an initial value setting means 404 constructed from a variable resistor or the like. Then, the supply of current to the light emitting device 200 is controlled by controlling a current control means 403 in accordance with the output of the comparator 402. The amount of light emission of the light emitting device is thus controlled to a level that matches the initial value. The circuit configuration of FIG. 4 is illustrative only, and is not restrictive.

The initial value setting in each control circuit 400 is performed as described below. First, all the light emitting devices 200 are activated to emit light. Next, the amount of light emission of each light emitting device 200 is set within prescribed conditions so that the amount of light falling on an illuminated object is substantially equal at any portion thereof. For example, when projecting the light from the respective light emitting devices 200 onto a photoconductive member through respective optical shutters, all the optical shutters are opened, and the respective light emitting devices are controlled so that the amounts of light transmitted through the respective optical shutters become substantially equal to each other, or so that the amount of light illuminating the photoconductive member becomes substantially equal at any portion thereof. Using this control value as the initial value, the initial value setting is performed in the initial value setting means 404 externally attached to the control circuit 400. Further, when the amount of light of the corresponding light emitting device 200 changes due to aging or due to changes in ambient temperature, etc., the supply of power to the light emitting device 200 is controlled through the comparator 402 and the power control means 403 so as to maintain the amount of transmitted light or illuminating light constant.

As shown in FIG. 3, the optical apparatus light source 100 employs a construction that uses two substrates, the first substrate 120 on which the optical pairs are arranged and the second substrate 130 on which the control circuits 400 for controlling the respective optical pairs are formed. This construction has the effect of preventing the optical pairs from being heated by the heat generated by the control circuits 400 when they control the amount of projected light Lg of the respective light emitting devices 200. The effect is further enhanced by providing the heat insulation member 140, between the first substrate 120 and the second substrate 130, and on, for example, the underside of the first substrate 120. Further, each light emitting device 200 has a limited lifetime, and therefore, needs to be replaced at appropriate intervals of time. In this case, since only the first substrate 120 must be replaced, the cost associated with the replacement can be reduced. Furthermore, by placing the first substrate 120 and the second substrate 130 one on top of the other, the size of the optical apparatus light source 100 itself can be further reduced.

As described above, in the optical apparatus light source 100 comprising the plurality of light emitting devices 200, the amount of light emission of each light emitting device 200 is detected by each individual light receiving device 300, and controlled to the predetermined amount of light emission by each individual control circuit 400; as a result, the entire amount of light of the optical apparatus light source 100 can be controlled extremely accurately. The above description has dealt with an example in which G color LEDs are used, but it will be appreciated that an R color light source or a B color light source can be constructed using red (R color) LEDS or blue (B color) LEDS in place of the G color LEDs.

Figure 5:
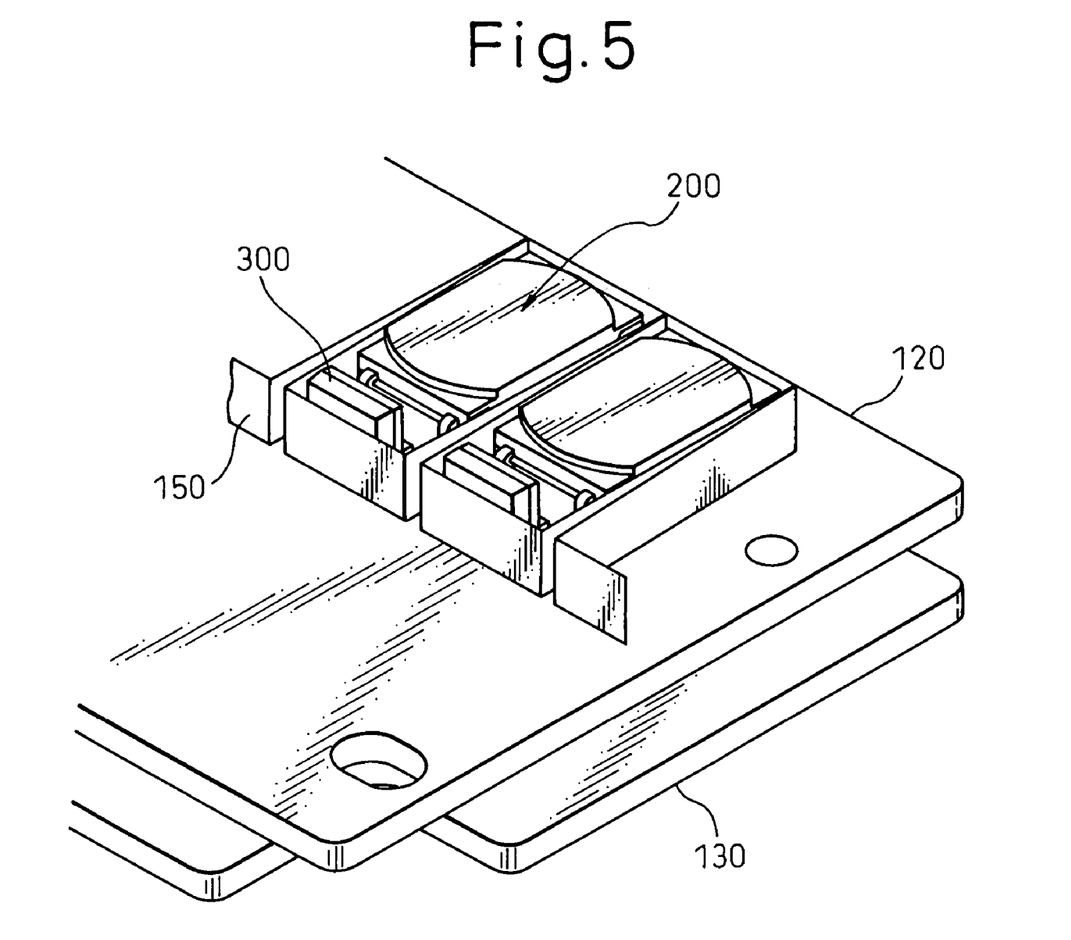
FIG. 5 is a diagram showing a light blocking member used in the present invention.

FIG. 5 shows an example in which a light blocking member 150 is provided between each respective optical pair. If each light receiving device 300 can receive light only from its corresponding light emitting device 200, high detection accuracy can be achieved. However, as the light emitting devices 200 are arranged adjacent to one another, there is the possibility of light leakage from adjacent light emitting devices, leading to an inability to accurately detect an amount of light emission. For this reason, the light blocking member 150 is provided to prevent light leakage between the optical pairs. The light blocking member shown in FIG. 5 is constructed by bending a single thin sheet of light blocking material in the form of bellows. However, the light blocking member is not limited to this particular structure, the only requirement being that it be constructed so as to be able to prevent light leakage between the optical pairs.

Figure 6:
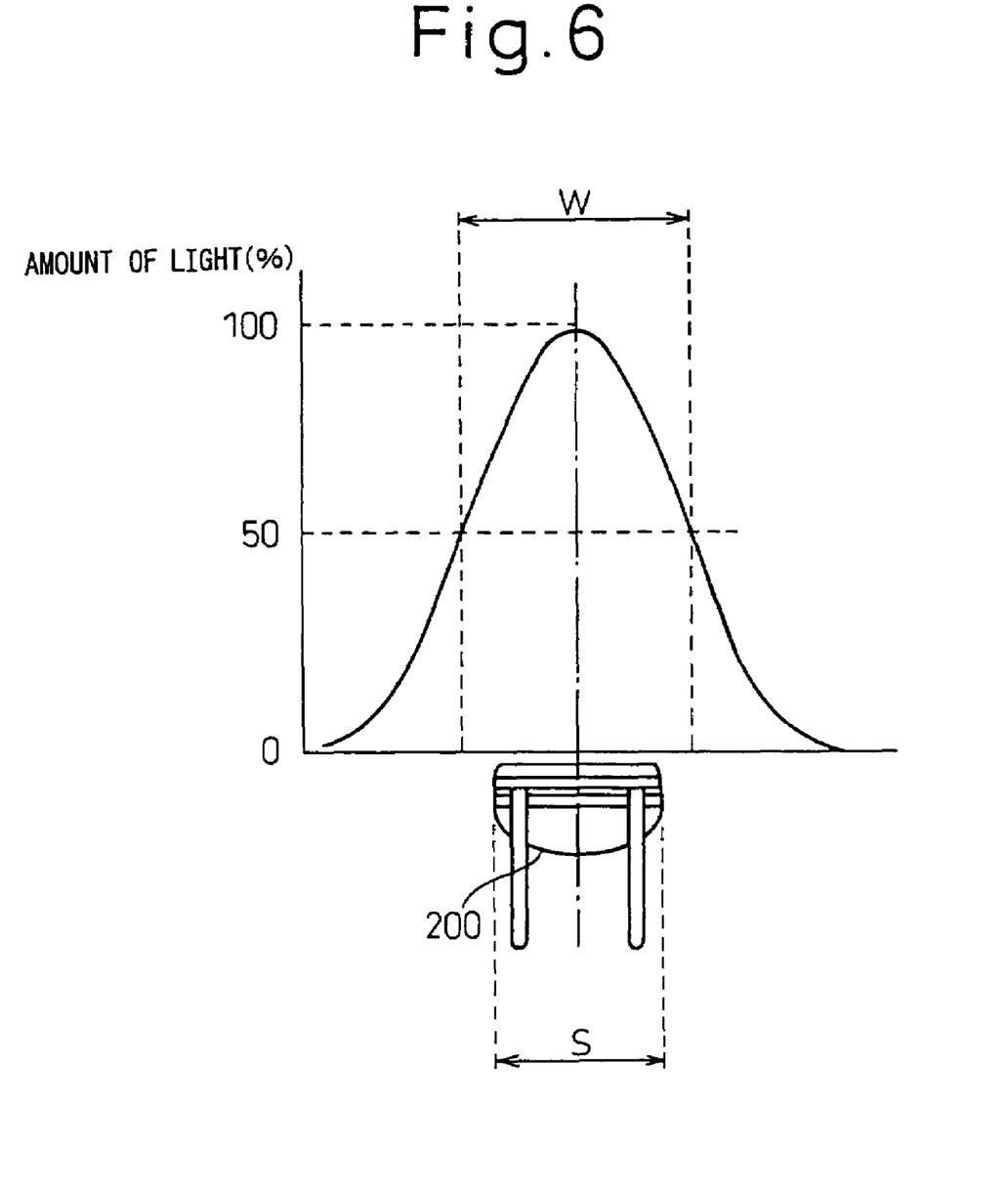
FIG. 6 is a diagram for explaining a full width at half maximum (FWHM) of the light source.

Next, the pitch of the light emitting devices 200 in the light source 100 and the distribution of the amount of light from the plurality of light emitting devices will be considered. First, the FWHM W (mm) of the projected light Lg of each light emitting device 200 will be explained with reference to FIG. 6. When the maximum amount of the projected light Lg of the light emitting device 200 measured along the arrow direction X in FIG. 2 is taken as 100%, the FWHM is the width (mm) of the portion at which the amount of light is 50%. The FWHM measured for the light emitting device 200 here was 8.8 mm. In the case of the light source 100 shown in FIG. 2, the ratio to the FWHM, that is, P (pitch of light emitting devices)/W (FWHM), is 0.96, since P=8.4 mm as earlier described. The longitudinal width S of each light emitting device 200 is 7.00 mm as previously described.

Figure 7:
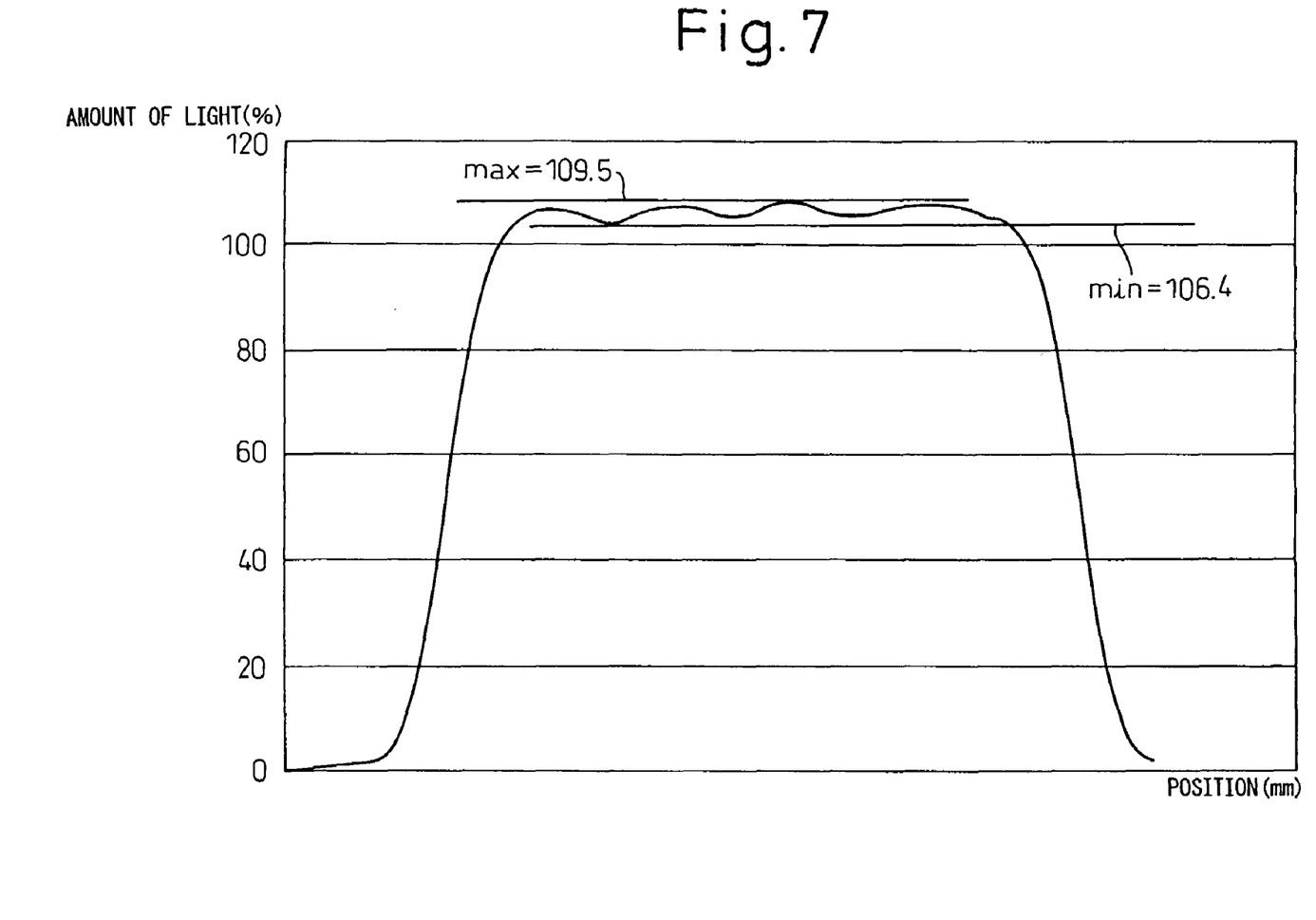
FIG. 7 is a diagram showing measured results of the distribution of the amount of light from the optical apparatus light source of the present invention.

Then, a light source (sample number 4) was constructed by arranging 28 light emitting devices 200 at a pitch P=8.4 mm as shown in FIG. 2, and the light amount distribution of the light source 100 was measured at a position (the position corresponding to the surface of a photosensitive material) spaced a prescribed distance away from the uppermost part of the light emitting devices 200. Measured results are shown in FIG. 7. In FIG. 7, the vertical axis represents the light amount in %, 100% being the maximum light amount measured at the position spaced the same distance away when only one light emitting device 200 was activated. The horizontal axis represents the position (mm) along the arrow direction X in FIG. 2. As shown in FIG. 7, the maximum value (max) of the measured results was 109.5%, and the minimum value (min) was 106.4%; hence, the min/max ratio was 0.97. The min/max ratio serves as a measure of the uniformity of the light amount distribution; it can be said that as its value becomes closer to 1.0, the uniformity of the light amount distribution increases.

A plurality of exposure apparatuses (sample numbers 1 to 3 and 5 to 7) were constructed by varying the pitch P of the light emitting devices 200, and the maximum value (max) and the minimum value (min) were measured on each sample by measuring the light amount distribution under the same conditions as those used for the light source 100 of sample number 4 described above. The measured results are shown in Table 1 below.

| SAMPLE NUMBER | PITCH (mm) | RATIO TO FWHM | MIN/MAX RATIO | MINIMUM VALUE (%) | MAXIMUM VALUE (%) |
|---|---|---|---|---|---|
| 1 | 9.2 | 1.05 | 0.89 | 92.5 | 104 |
| 2 | 8.9 | 1.01 | 0.93 | 97.7 | 105.1 |
| 3 | 8.7 | 0.99 | 0.95 | 103.0 | 108.4 |
| 4 | 8.4 | 0.96 | 0.97 | 106.4 | 109.5 |
| 5 | 8.2 | 0.93 | 0.95 | 107.3 | 113.1 |
| 6 | 8.0 | 0.91 | 0.93 | 109.5 | 117.1 |
| 7 | 7.5 | 0.85 | 0.91 | 115.3 | 127.1 |

Figure 8:
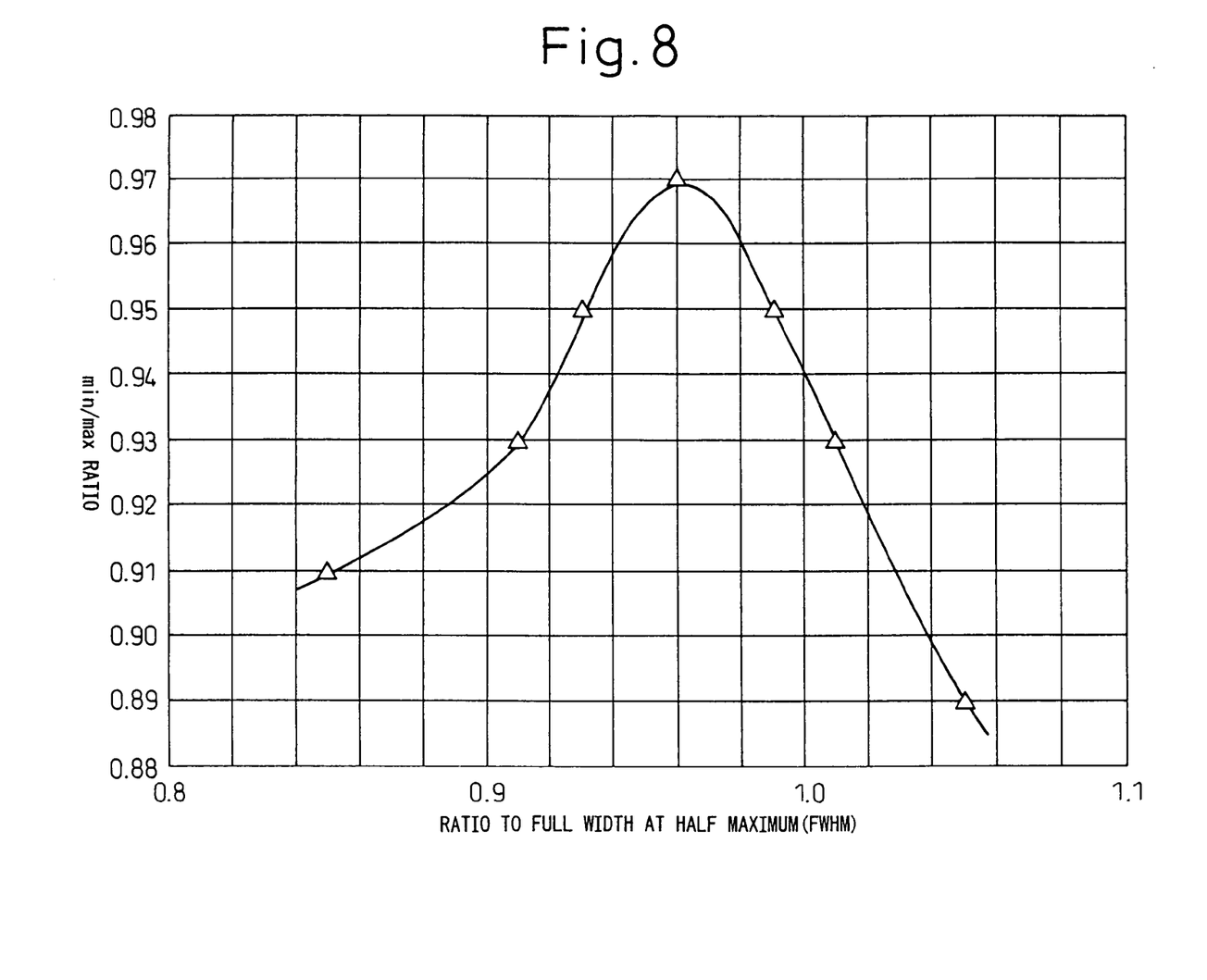
FIG. 8 is a diagram showing the relationship between the min/max ratio and the ratio to the FWHM.

FIG. 8 shows a graph constructed based on Table 1 by plotting the min/max ratio along the vertical axis and the ratio to the FWHM along the horizontal axis. As can be seen from FIG. 8, when the ratio to the FWHM is in the range of 0.91 to 1.01, the min/max ratio is 0.93 or higher, indicating that the light amount distribution is uniform. Further, when the ratio to the FWHM is in the range of 0.93 to 0.99, the min/max ratio is 0.95 or higher, indicating that the light amount distribution is highly uniform.

This means that a light source having a uniform light amount distribution can be provided by setting the ratio to the FWHM (P/W ratio) within the range of 0.91 to 1.01. Furthermore, using the same light source, a highly uniform light amount distribution can be achieved by setting the ratio to the FWHM (P/W ratio) within the range of 0.93 to 0.99.

Figure 9:
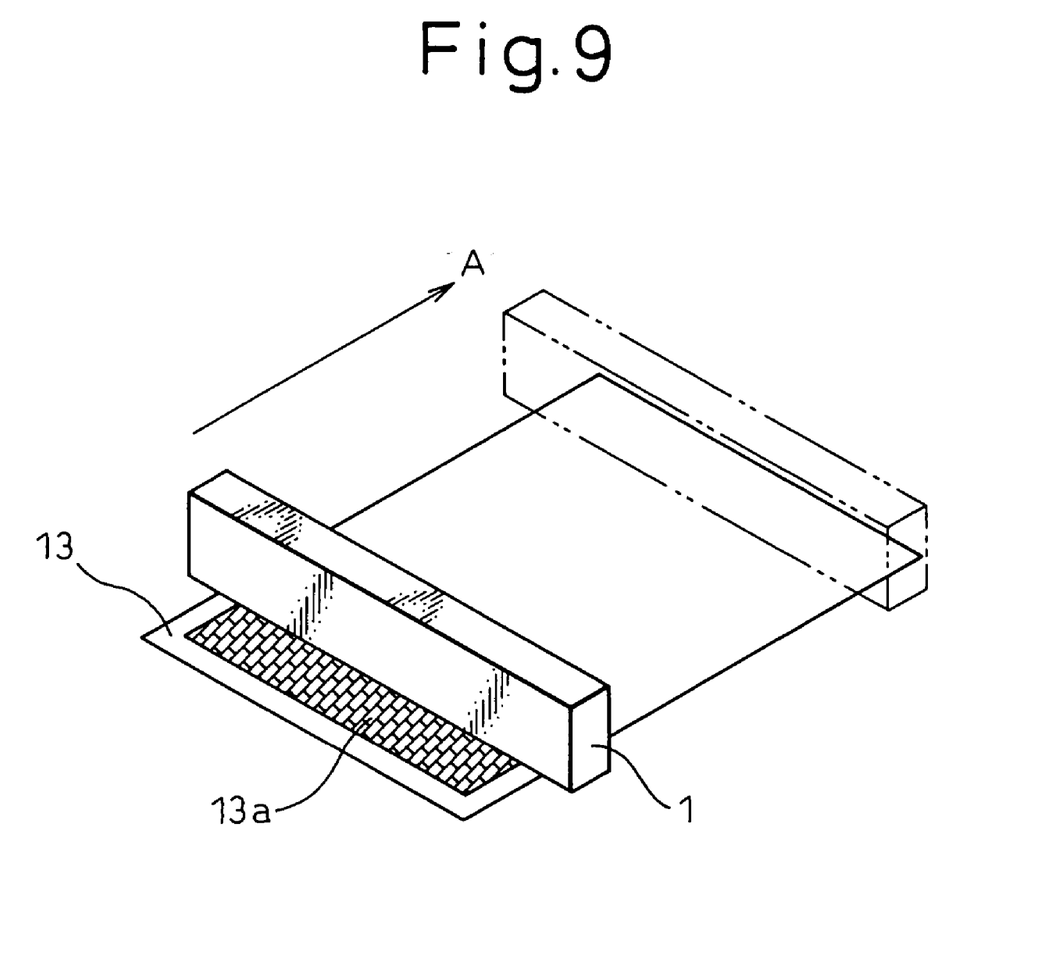
FIG. 9 is a diagram for explaining the formation of a latent image by an exposure apparatus.

FIG. 9 is a diagram showing an example in which the optical apparatus light source 100 of the present invention is used in an exposure apparatus 1 for illuminating a photosensitive material for exposure. The exposure apparatus 1 incorporates three light sources, a red (R) light source, a green (G) light source, and a blue (B) light source, for exposing a photosensitive material. Light from each light source is projected onto the photosensitive material through an optical shutter or other kind of image forming means. The optical apparatus light source 100 of the present invention can be used as the red (R) light source using R color LEDs, as the green (G) light source using G color LEDs, or as the blue (B) light source using B color LEDs. Any one of or all of the three light sources may be constructed in accordance with the optical apparatus light source 100 of the present invention.

Next, an example of an image forming method using the exposure apparatus 1 will be described. First, a photosensitive member 13 of a prescribed size is fixed in position. Next, a full-color latent image 13a is formed on the photosensitive member 13 by exposure to the respective color lights (R light, G light, and B light) by moving the exposure apparatus 1 in arrow direction A. After the formation of the latent image, prescribed processing such as developing is performed to form a visible full-color image on the photosensitive member 13. After forming the latent image 13a by moving in the arrow direction A along the photosensitive material 13, the exposure apparatus 1 moves back to its home position, i.e., the standby position. Thereafter, a new photosensitive member 13 is placed, and the exposure process for latent image formation is repeated. In the example of FIG. 9, the exposure apparatus 1 is moved while the photosensitive member is held fixed, but conversely, the photosensitive member may be moved while the exposure apparatus 1 is held fixed.

The invention claimed is:

1. A light source for an optical apparatus, comprising a light emitting device, a light receiving device for detecting the amount of light of said light emitting device, and light emission control means for controlling the amount of light of said light emitting device in accordance with the amount of light detected by said light receiving device, wherein said light receiving device is disposed on one side of said light emitting device to constitute an optical pair, and a plurality of said optical pairs are arranged on a substrate, wherein said plurality of light emitting devices are arranged at pitch P in a substantially straight line, and wherein P/W representing the ratio of said pitch P to a value W is set as 0.91<P/W<1.01, where W is a full width at half maximum (FWHM) of a light amount distribution curve measured in a direction in which said plurality of light emitting devices are arranged when each individual one of said light sources is singly operated to emit light.

2. A light source for an optical apparatus as claimed in claim 1, wherein said plurality of optical pairs, each consisting of said light receiving device and said light emitting device, are arranged in a substantially straight line on a first substrate, and said light emission control means are arranged in a substantially straight line on a second substrate.

3. A light source for an optical apparatus as claimed in claim 1, wherein said ratio P/W is set as 0.93≦P/W≦0.99.

4. A light source for an optical apparatus as claimed in claim 2, wherein said first substrate and said second substrate are overlaid one on top of the other.

5. A light source for an optical apparatus as claimed in claim 4, wherein said second substrate is placed under said first substrate.

6. A light source for an optical apparatus as claimed in claim 4, wherein said light emission control means are arranged on said second substrate at positions corresponding to said optical pairs to be controlled by said light emission control means.

7. A light source for an optical apparatus as claimed in claim 5, wherein a heat insulating member is provided between said first substrate and said second substrate.

8. A light source for an optical apparatus as claimed in claim 7, wherein said heat insulating member is provided on an underside of said first substrate.

9. A light source for an optical apparatus as claimed in claim 2, wherein said first substrate and said second substrate are secured to a frame to form a line light source unit.

10. A light source for an optical apparatus as claimed in claim 9, wherein said frame has a window for projecting therethrough the light emitted from said plurality of light emitting devices.

11. A light source for an optical apparatus as claimed in claim 9, wherein said frame is constructed from a thermally conductive member.

12. A light source for an optical apparatus as claimed in claim 2, including connecting means for electrically connecting said first substrate and said second substrate.

13. A light source for an optical apparatus as claimed in claim 1, wherein a light blocking member for preventing light from leaking to each of said light receiving devices from other than a corresponding one of said light emitting device is provided.

14. A light source for an optical apparatus as claimed in claim 13, wherein said light blocking member is a light blocking plate provided between said optical pairs.

15. A light source for an optical apparatus as claimed in claim 10, wherein optical modulating means is provided in said window formed in said frame.

16. A light source for an optical apparatus as claimed in claim 15, wherein said optical modulating means is provided inside said frame.

17. A light source for an optical apparatus as claimed in claim 15, wherein said optical modulating means is a diffusing plate.

18. A light source for an optical apparatus as claimed in claim 15, wherein said optical modulating means is a lens.

19. A light source for an optical apparatus as claimed in claim 1, wherein said light emission control means includes switching means for controlling the supply of current to said light emitting device based on a signal from said light receiving device.

20. A light source for an optical apparatus as claimed in claim 19, wherein said light emission control means includes initial value setting means for setting an initial value for said light emitting device.

21. A light source for an optical apparatus as claimed in claim 1, wherein said light emitting device includes an LED as a light producing part.

22. A light source for an optical apparatus as claimed in claim 1, wherein said light emitting device includes a reflecting member for reflecting light from said light emitting device into substantially parallel rays of light.

23. A light source for an optical apparatus as claimed in claim 22, wherein said reflecting member is a spherical concave mirror.

* * * * *